Figure 1:
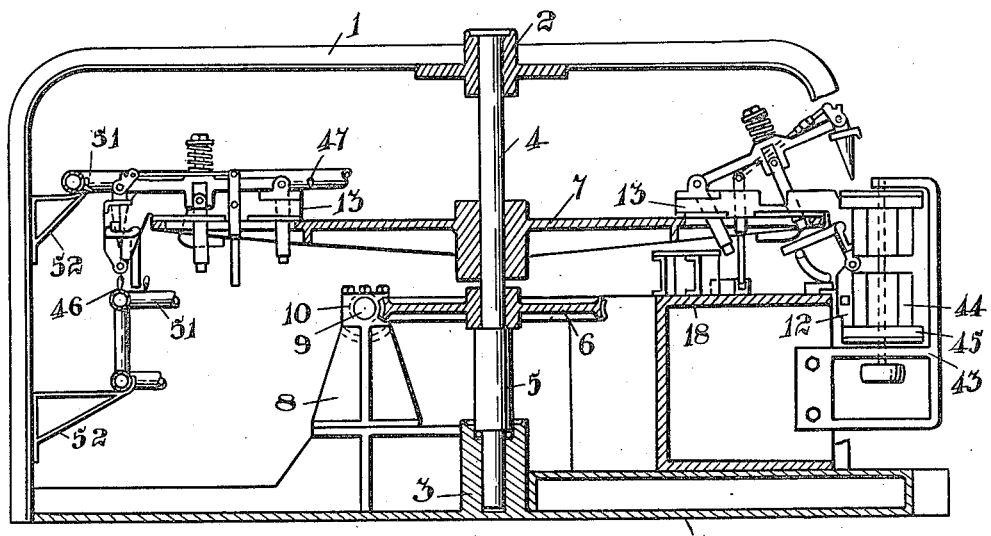

Dec. 4, 1923.

A. J. WALKER 1,476,122

APPARATUS FOR THE MANUFACTURE OF ICE CREAM CONES

Filed April 28, 1921      6 Sheets-Sheet 1

INVENTOR
A. J. Walker
BY J. Edw. Maybee

ATTY.

Dec. 4, 1923.

A. J. WALKER 1,476,122

APPARATUS FOR THE MANUFACTURE OF ICE CREAM CONES

Filed April 28, 1921  6 Sheets-Sheet 2

INVENTOR
A. J. Walker
BY J. Edw. Maybee
ATTY.

Dec. 4, 1923.
A. J. WALKER
1,476,122
APPARATUS FOR THE MANUFACTURE OF ICE CREAM CONES
Filed April 28, 1921
6 Sheets-Sheet 3

INVENTOR
A. J. Walker
BY J. Edw. Maybee
ATTY.

Dec. 4, 1923.                                              1,476,122
                          A. J. WALKER
           APPARATUS FOR THE MANUFACTURE OF ICE CREAM CONES
                   Filed April 28, 1921        6 Sheets-Sheet 5

INVENTOR
A. J. Walker
BY
J. Edw. Maybee
ATTY.

Patented Dec. 4, 1923.

1,476,122

UNITED STATES PATENT OFFICE.

ALEXANDER J. WALKER, OF OWEN SOUND, ONTARIO, CANADA, ASSIGNOR TO HENRY PATERSON WALKER, OF HEPWORTH, ONTARIO, CANADA.

APPARATUS FOR THE MANUFACTURE OF ICE-CREAM CONES.

Application filed April 28, 1921. Serial No. 465,301.

*To all whom it may concern:*

Be it known that I, ALEXANDER J. WALKER, a subject of the King of Great Britain, and a resident of the city of Owen Sound, in the county of Grey, Province of Ontario, Canada, have invented certain new and useful Improvements in Apparatus for the Manufacture of Ice-Cream Cones, of which the following is a specification.

This invention relates to apparatus for forming and cooking conical food containers, which are themselves edible, and particularly to that type of apparatus in which a series of molds and co-operating cores are arranged on a rotary carrier, which carries each mold in succession to a filling device, thence past heating devices to a discharging point, suitable means being provided for actuating the feeding device, opening and closing the molds, and moving the cores to and from their co-operating position with the molds as may be necessary.

The machines of this character now in use have usually been of two types, viz. those in which the rotary carrier continuously revolves and the batter feeding mechanism is depended upon to squirt enough batter into the molds as they pass, and those in which the rotary carrier is stopped while the batter is being fed into the mold. In the second type, the advantages of a continuously moving carrier are sacrificed for those of an economical and efficient batter feeding device, and in the first type the position is just the reverse.

I overcome these objections by devising apparatus in which the rotary carrier continuously revolves and in which the batter feeding mechanism is engaged by the rotary carrier to cause it to travel with the mold a sufficient distance for the mold to be supplied with the proper amount of batter, and which feeding mechanism will then return to its normal position ready for filling the next mold in the series.

Further objects are to devise an improved form of mold; to provide improved means for keeping the molds clean and free of pieces of broken cones; to provide improved means for bringing and locking the cores in position in the molds, so that if there is an obstruction in any particular mold, its co-operating core is allowed to remain unseated, thus preventing any breakage due to the forcing of the core into the mold; to so arrange the cores that they will assist in the removal of the cones from the molds; and to so arrange the core supporting arms that the cores will be brought into position in the molds with greatly diminished speed towards the end of their movement to allow the free escape of steam from the batter being cooked. A still further object is to devise an improved device for feeding the batter to the molds.

I attain my objects by means of the constructions hereinafter described and illustrated in the accompanying drawings in which—

Figure 10:
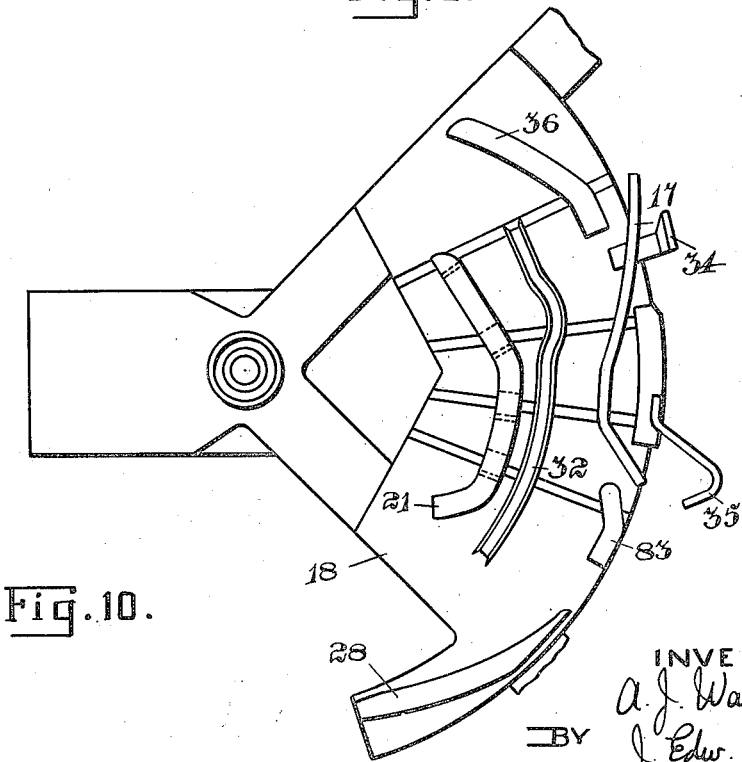
Figure 2:
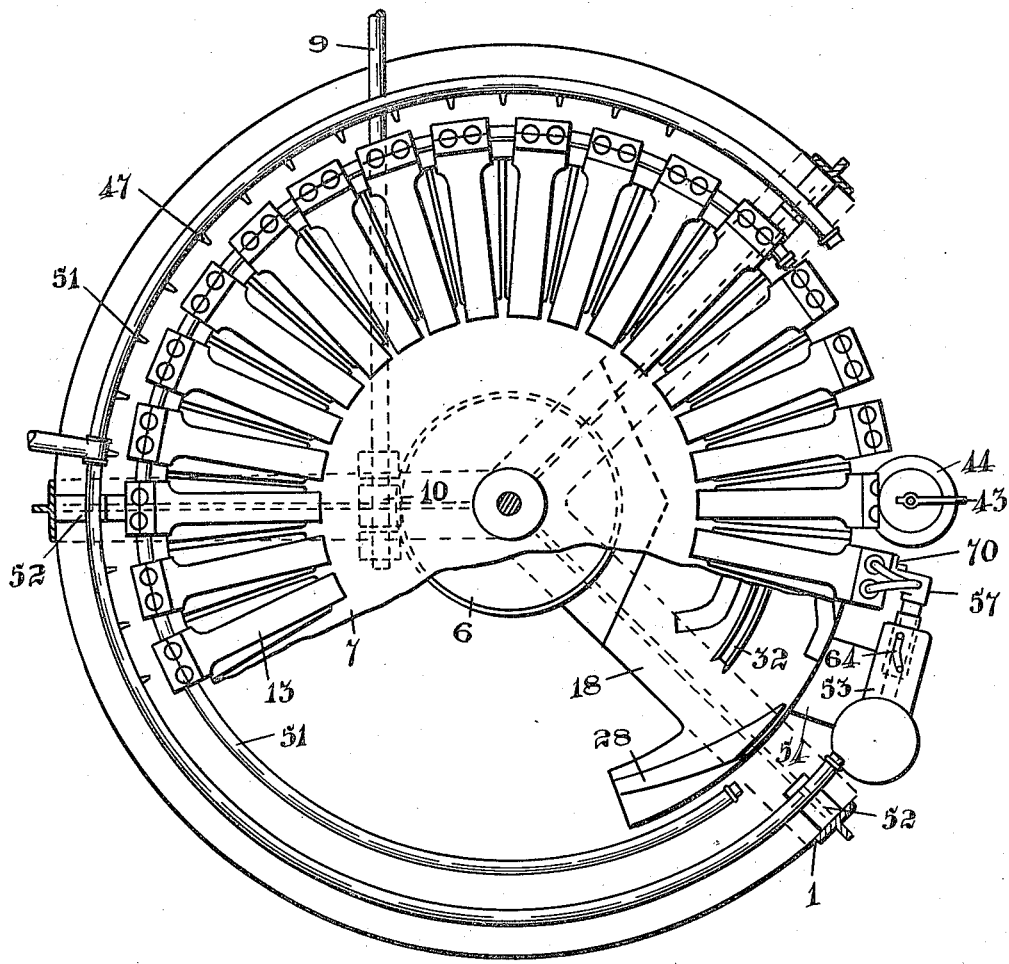
Figure 3:
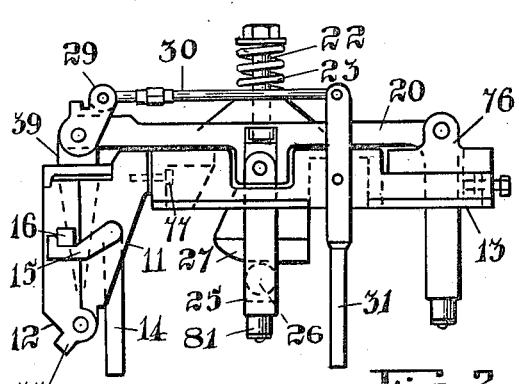
Figure 5:
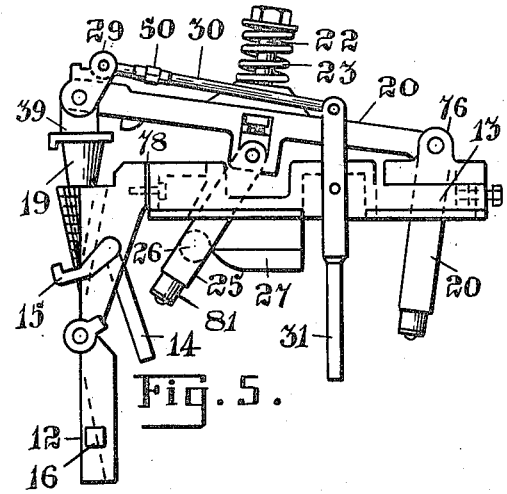
Figure 4:
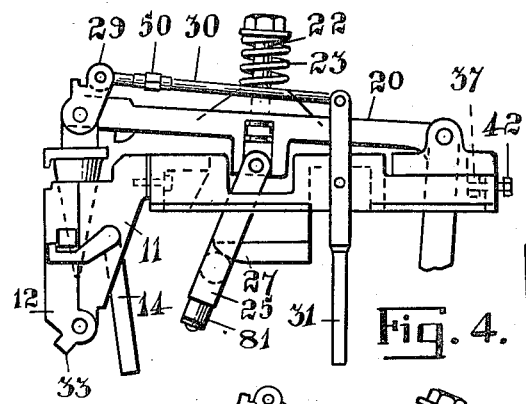
Figure 6:
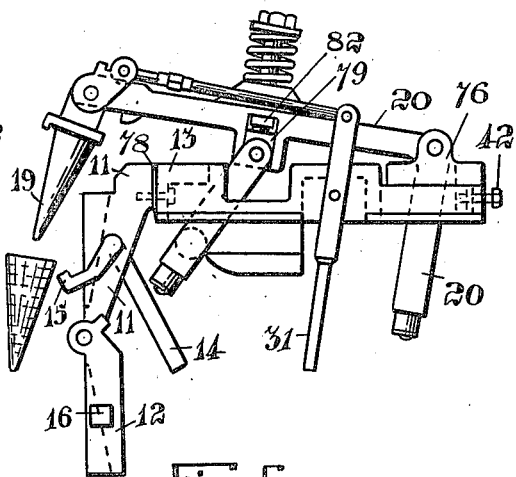
Figure 7:
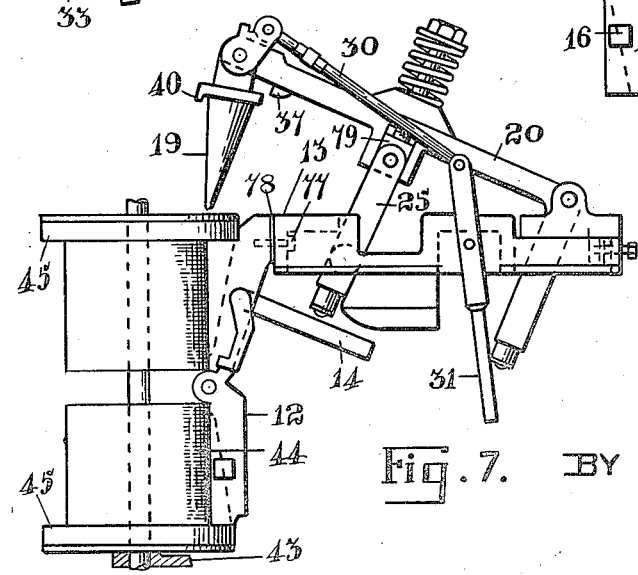
Figure 8:
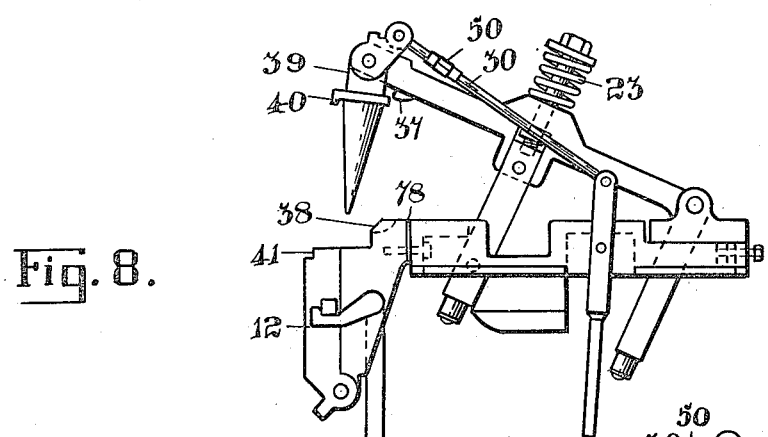
Figure 9:
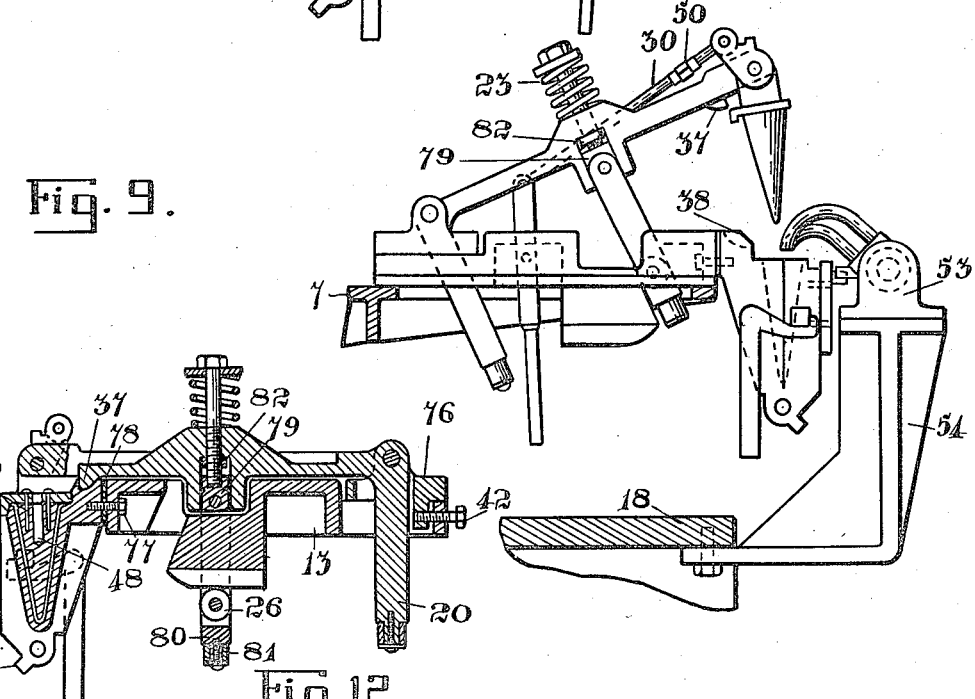
Figure 12:
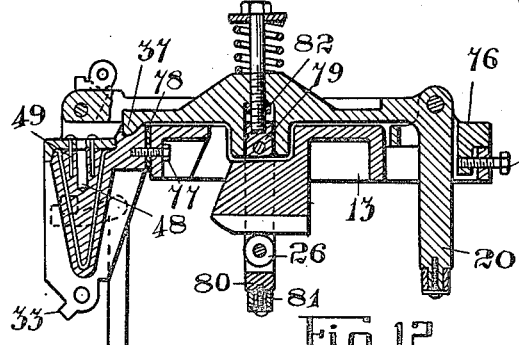
Figure 11:
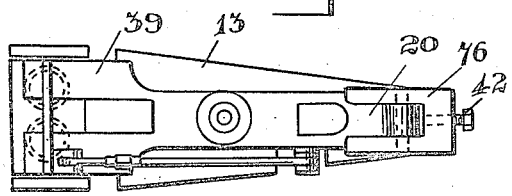
Figure 13:
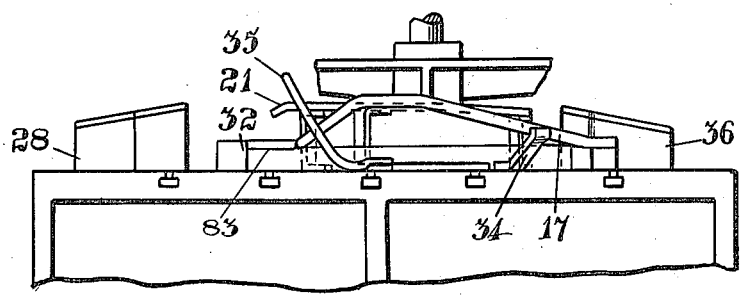
Figure 14:
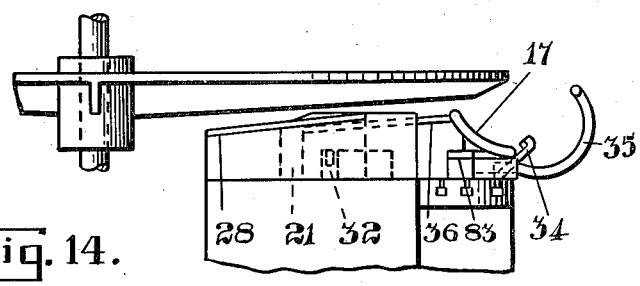
Figure 15:
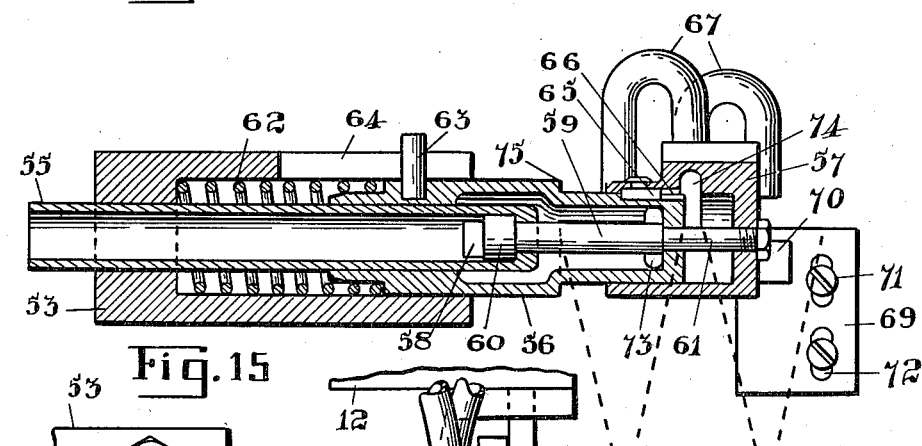

Fig. 1 is a side elevation of my improved apparatus, partly in section, showing only a mold and core unit in position at each side of the same;

Fig. 2 a plan view of the apparatus showing only a portion of the molds and cores in position;

Fig. 3 a detail in side elevation showing a mold section in closed position and a core in position therein;

Fig. 4 a similar view showing the core in slightly raised position;

Fig. 5 a similar view showin the outer section of the mold in open position, the core being slightly raised from the position shown in Fig. 4;

Fig. 6 a similar view showing the core further raised and tilted outward to remove the cone from the mold;

Fig. 7 a similar view showing the core in its uppermost position and the open mold in engagement with the rotary brush;

Fig. 8 a similar view showing the movable section of the mold back in closed position;

Fig. 9 a similar view showing the mold in engagement with the batter feeding device and being filled thereby;

Fig. 10 a plan view of the cam supporting table with the cams in position thereon;

Fig. 11 a plan view of one of the mold and core units;

Fig. 12 a longitudinal section of one of the mold and core units with the core in position in the mold;

Fig. 13 a side view of the cam supporting table with the cams in position thereof;

Fig. 14 an end view of the cam supporting table with the cams in position thereof;

Fig. 15 a vertical section of the batter feeding apparatus; and

Figure 17:
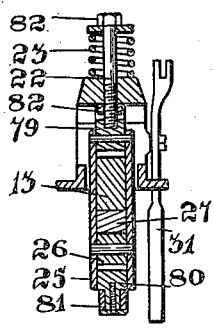
Figure 16:
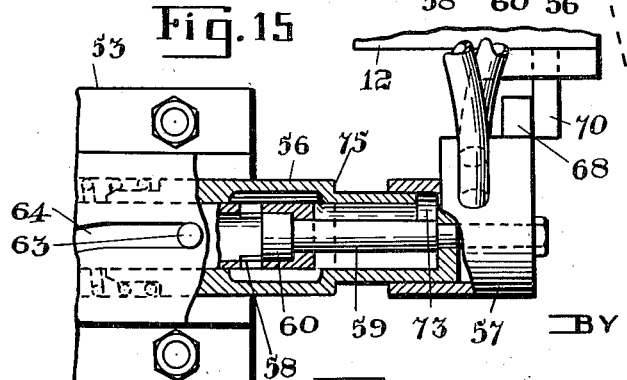
Figure 18:
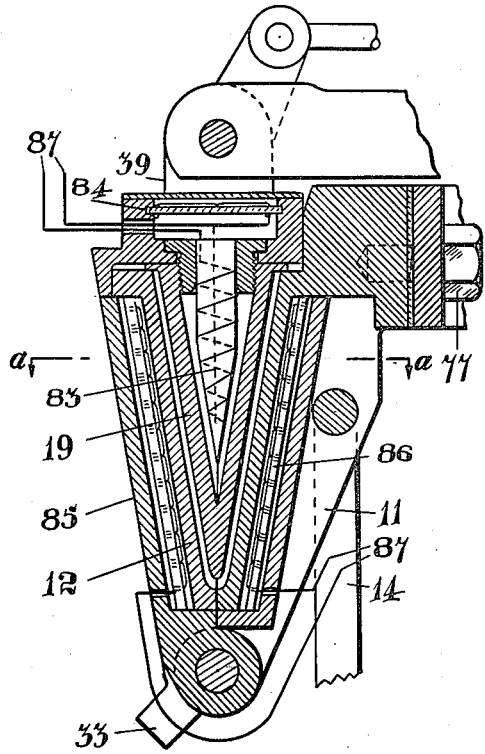
Figure 19:
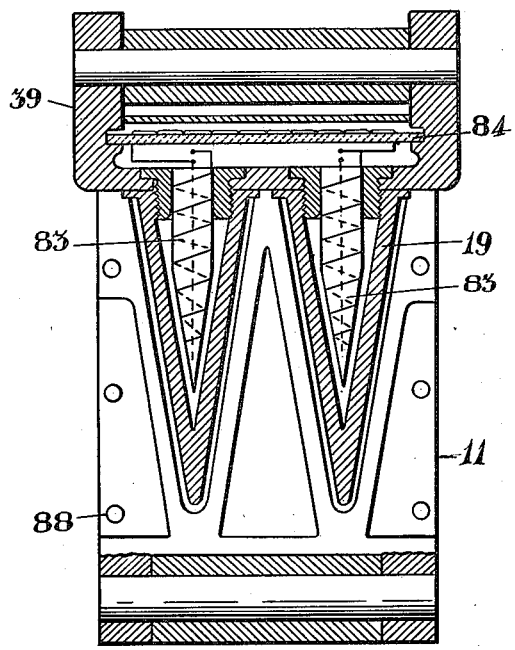

Fig. 16 a horizontal section of the same;

Fig. 17 a cross section through one of the mold and core units with the core supporting arm in locked position;

Fig. 18 a vertical section of a mold and core showing electric heating means applied thereto;

Fig. 19 a similar view to Fig. 18 taken in the opposite direction; and

Figure 20:
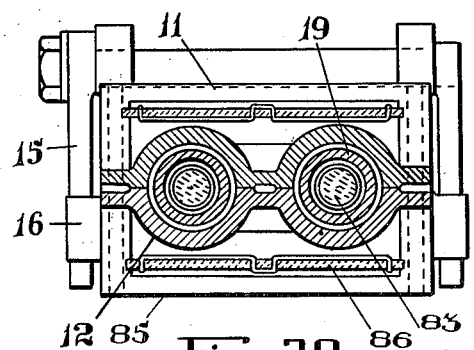

Fig. 20 a section on the line a—a in Fig. 18.

In the drawings like numerals of reference indicate corresponding parts in the different figures.

Referring particularly to Fig. 1 of the drawings, 1 is the frame of the apparatus suitably shaped to support the different parts. In the bearing 2 located at the top of the frame and a bearing 3 located at the bottom is journalled the vertical rotary shaft 4. This shaft has an enlarged portion 5 formed thereon immediately above the bearing 3, and the bearing 3 is counterbored to provide room for ball bearings on which the lower end of the enlarged portion 5 rotates.

On this shaft 4 immediately above the enlarged portion 5 is keyed or otherwise suitably secured the worm gear 6, and immediately above the worm gear the rotary carrier 7 is suitably secured to the shaft so that it will rotate therewith.

The apparatus is driven by means of a shaft 9 supported on standards 8, the shaft being provided with a worm 10 meshing with the worm gear 6.

On the rotary carrier 7 is suitably supported a series of mold and core units. Each mold and core unit is formed as follows. On the rotary carrier 7 are suitably supported a plurality of members 13, and the molds are supported on the outer end of each member. For convenience in removing the cones from the molds, I preferably form each mold in two parts, a stationary section 11 secured to the outer end of the member 13 by means of bolts 77, and a movable section 12, preferably hinged to the lower end of the stationary section 11. As the molds are subjected to considerable heat in order that the batter therein may be cooked, the stationary sections 11 are preferably separated from the members 13 by blocks of asbestos 78 in order to lessen the amount of heat lost by conduction to the members 13. A considerable saving in heat will thus be effected. Instead of dividing the molds radially of the rotary carrier as is usual with machines of this type, I prefer to divide them circumferentially of the machine, so that the movable sections 12 will swing outwardly. This construction is important, as I am thus enabled to mount a greater number of mold units circumferentially of the carrier, as no space is required for the spreading of the mold sections to allow the cones to be removed. This transversely divided hinged mold construction has a further advantage which will hereinafter appear.

To lock the movable mold sections 12 in closed position against the stationary section 11, I provide the latch 15, preferably formed as part of a lever 14 fulcrumed on the stationary section 11, which latch engages a keeper 16 formed on the movable mold section 12.

To unlock the movable mold sections, I provide a cam 17, supported on the cam-supporting table 18, so positioned and shaped that the lower end of the lever 14 will engage with its inside edge and be pulled inwardly as it travels along the surface of the cam to release the latch 15 from its engagement with the keeper 16.

When the latch 15 is free of the keeper 16, the lower end of the movable mold section 12, which is provided with a lug 33 for that purpose, engages with a cam 34, also supported on the table 18, which swings the movable mold section 12 away from the stationary section 11.

To bring the movable mold sections back into closed position, I provide the cam 35, supported on the table 18, which cam is so shaped that it will raise and close the movable mold sections as they pass along its surface.

All this time the lever 14 has been in engagement with the cam 17, and immediately the movable mold section 12 is back in closed position against the stationary section 11, the lever 14 engages the locking cam 83, which immediately rocks the lever so that the latch 15 will engage the keeper 16 to lock the mold closed.

Each core 19 is preferably supported on an arm formed as a bell crank 20 fulcrumed on a slide 76 slidable on the member 13 towards the inner end of said member. The inner end of the bell crank 20 is adapted to engage a cam 21 supported on the table 18. This cam is so shaped that when the bell crank 20 engages with its surface, the bell crank will be rocked so that the core 19 is gradually raised from its position within the mold 11—12.

I prefer, however, to pivotally connect the core 19 with the end of the bell crank 20, and to control the rocking of the core on its pivot I provide the lever 31 fulcrumed on the member 13, which lever is pivotally connected at its upper end with a link 30 pivotally connected with a lug 29 formed on the upper end of the core 19.

The lower end of the lever 31 is adapted to engage a cam 32, which, owing to the direction in which the end of the lever has to travel, will usually be formed of channel section. This cam is so shaped that the core, when being removed from the closed mold, will first be lifted vertically for a short distance, and then, when the mold is open and while the core continues to rise, will give the lower end of the core an outward movement, which movement of the core is designed to pick out the cone from the mold and bring it to a position in which it will drop clear of the mold. This cam 32 is so shaped towards its other end that when the core is to be returned to a position in the mold, the core will be rocked on its pivot so that after entering the mold the axis of the core will be in alinement with the axis of the mold. This is very important, as the batter is thus diverted evenly on all sides of the core, thus preventing the formation of cones with sides of uneven thickness, or cones of greater height on one side than the other.

Through the bell crank 20 I slidably support a rod 22. This rod extends a distance above the bell crank 20 and has a spring 23 supported thereon, the rod being provided with a suitable head or nut and washer to hold the spring in place thereon. On the lower end of this rod 22 is threaded a block 79, and on this block is pivotally connected a forked locking member 25. Between the legs of the locking member is journalled a roller 26, which is adapted to engage a cam 27 formed on or secured to the under side of the member 13. The forked ends of the locking member are secured together by a block 80, on which is journalled an antifriction roller 81.

Assuming the bell crank 20 with the core 19 to be in raised position, as the bell crank 20 drops to its lower position the antifriction roller 81 engages a cam 28, which forces the member 25 over so that the roller 26 is forced under the cam 27 to hold the bell crank 20 down and the core in position in the mold. These cams 27 and 28 are so shaped that the roller 26 will be forced under the cam 27 and the core brought to its final position with greatly diminished speed towards the end of the locking operation. The roller 26 is released from engagement with the cam 27 by means of a cam 36 supported on the table 18.

Threaded on the rod 22 above the block 29 is a nut 82, which is used to move the rod 22 up or down relative to the bell crank 20 to vary the pressure applied to the bell crank.

Each mold section 11—12 will preferably have at least two mold cavities formed therein, and I therefore preferably form the cores 19 with a common head 39 to which the separate cores are secured by means of screws 49.

The head 39 is provided with a hole 48 which is alined with a hole formed in the upper end of each individual core. The hot air and gases from the heating apparatus are thus allowed to enter this hole, and thus the cones are cooked from the inside as well as from the outside.

It will be understood, of course, that while I show each mold and core unit as being adapted to hold two cones, I may, if desirable, supply a separate unit for each cone, or may construct the separate units so that they will accommodate a greater number of cones.

To properly position the core in the mold, the bell crank 20 is provided with a projection 37 engageable in a notch 38 formed in the outer end of the member 13. The core head 39 is formed with an inclined shoulder 40 which engages a shoulder 41 formed on the outer edge of the movable mold section 12. A set screw 42 is also screwed through the end of the member 13 and engages the slide 76, whereby by moving the slide 76 with the bell crank 20 forward or backward, the core may be positioned accurately in the mold. The link 30 may, if desired, be formed in two pieces, and a turnbuckle 50 used to connect the two parts in order that the rocking of the core on its pivot may be regulated. It will thus be seen that the position of the core in the mold may be very accurately adjusted.

As there will usually be a pressure of approximately 500 pounds exerted to hold the core in position in the mold, the spring 23 will usually be tensioned to resist a pressure of about 400 pounds before compressing. If then, there be an obstruction in the mold, rendering it impossible to force the core to its proper seat in the mold, this spring will yield sufficiently to avoid the forcing of the core into position in the mold and the consequent breaking of some of the parts, and the spring is still of sufficient strength to hold the core in position in the mold under normal conditions.

As sometimes a cone will become broken and part of it will stick in the mold, I find it desirable to provide means for cleaning the molds. I therefore support on a bracket 43, supported on the table 18 or other stationary part, a brush 44, which brush may be rotated, if desired, in any suitable manner. This brush is so positioned on the machine that it will contact with the mold when it is in open position. This brush has an enlarged portion 45 at each end adapted to clean off the top of the mold sections and thus remove any fins which may have squeezed through between the mold and core when the cone was being cooked.

46 and 47 are the usual gas jets or other heating devices for heating the molds as they pass by to cook the cones. These jets are connected to pipes 51 supported on brackets 52 supported on the frame 1.

The batter feeding device comprises broadly a supporting member 53, a supply pipe 55 extending through the end of the supporting member, a measuring slide 56 slidable on the pipe 55 within the supporting member 53, a head 57 slidable on the other end of the measuring slide, and a rod secured to the head extending through the measuring slide into the pipe 55.

The supporting member 53 will be supported on some suitable stationary part. I show it as being supported on a bracket 54 secured to the table 18. Through this supporting member extends the batter supply pipe 55, which pipe in practice will be connected to suitable apparatus for supplying batter under pressure from a batter supply hopper. This supporting member 53 is counterbored to receive the batter measuring slide 56, and between the bottom of the counterbore and the end of the slide is located a coil spring 62. On the outer end of the measuring slide is slidably supported the head 57.

Secured to the measuring slide 56 is a pin 63 slidable in a slot 64 in the upper surface of the support 53. This slot extends longitudinally of the support for almost half its length and is then directed off to one side at an angle. The result is that when the slide is forced into the support, it travels straight for a distance and then is slightly rotated as it is forced back the remaining distance.

The batter supply pipe is closed at its end and has ports 58 formed in its sides. Through the closed end of the batter supply pipe and slidable therein is the rod 89, which has an enlargement 60 thereon of the full diameter of the inside of the batter supply pipe.

This rod 59 has a portion 61 of reduced diameter towards its outer end, which portion extends through the end of the measuring slide and is secured to the end of the head 57. To prevent the head rotating on the measuring slide, I insert a key 65 in the head, which is slidable in a keyway 66 formed in the measuring slide 56. Secured to the head 57 are the feeding spouts 67, one for each mold cavity.

Ports 73 are provided in the wall of the measuring slide 56 adapted to communicate with ports 74 formed in the head 57 communicating with the supply spouts 67.

On the head 57 I form a projection 68, and to each of the movable mold members 12 I secure, by means of screws 71, a plate 69 having a projection 70 formed thereon. This plate 69 has slots 72 formed therein to provide for vertical adjustment of the plate on the screws 71.

The chamber within the measuring slide 56 will be of a size sufficient to hold the quantity of batter which it is desired to feed to the molds.

Normally the ports 73 and 74 will be out of alinement, and the ports 58 in the supply pipe will be in communication with the measuring slide. As the rotary carrier is rotated, the projection 70 engages the projection 68, and the spouts 67 will then be in a position to discharge batter into the mold depressions. As the rotary carrier continues to move, the head 57 is forced back on the measuring slide until it engages the measuring slide, bringing the ports 73 into alinement with the ports 74. At the same time the rod 59 is forced back through the supply pipe 55 shutting off the ports 58. As the head cannot slide further on the measuring slide, the measuring slide is forced back on the supply pipe 55 into the support 53, and the head of the supply pipe forces the batter within the measuring slide out through the ports 73—74 through the spouts 67 into the molds. As by this time the pin 63 travelling in the slot 64 has rotated the head and measuring slide sufficiently to enable the projection 68 to clear the projection 70, the spring 62 acting on the measuring slide and the batter under pressure acting on the enlargement 60, the various parts are forced back to their normal position opening the ports 58 and closing the ports 74, and the projections 68 is then in position to engage with the projection 70 on the next mold.

The rotating of the head and measuring slide has also a further important advantage in that the ends of the spouts 67 are raised to a sufficient extent to prevent batter dripping until the spouts are in position over the next mold.

The method of operation of the apparatus is as follows. Assuming the mold to be in closed position and ready to be supplied with batter, as the rotary carrier rotates, the projection 70 on a mold engages the projection 68 on the batter feeding device to operate the same to supply the mold with the proper amount of batter. As the mold becomes disengaged from the batter feeding device, the bell crank 20 carrying the core 19 is allowed to drop and the locking member 25 is engaged by the cam 28 to force the roller 26 underneath the cam 27 to lock the core in the mold. As previously stated, the cams 27 and 28 are so shaped that the core 19 finishes the last part of its downward movement with greatly diminished speed, thus allowing the steam to escape from the cooking batter, and the core does not reach its final seated position until the batter is partially cooked, though still in plastic condition.

The mold with the batter passes between the gas jets 46 and 47 by means of which the cones are cooked. When the mold has passed through the cooking section, the locking member 25 engages the cam 36 to release the bell crank 20, the bell crank 20 then engages the cam 21 to lift the core from the mold, and as the cone is usually provided with a patterned outer surface, it will remain in the mold. When the core has been lifted about one-half inch, the lever 14 engages the cam 17 to unlock the hook 15 from its engagement with the projection 16, when the movable mold section 12 engages the cam 34 to open the mold. The bell crank 20 still continues to lift the core from the mold, but through the medium of the link 30 and lever 31 engaging the cam 32, the core is rocked on its pivot to give its lower end an outward movement to remove the cone from the mold, ensuring its release even if it shows any inclination to stick.

The open mold then comes into contact with the rotary brush 44 by means of which the mold is thoroughly cleaned. The movable mold section then comes into contact with the cam 35, by means of which it is raised and returned to closed position, and the lever 14, by engagement with the cam 36, is rocked to bring the latch 15 into engagement with the keeper 16 to lock the mold closed ready to be again engaged by the batter feeding mechanism.

Instead of the gas jets 46 and 57, I may use electric heating means as shown in Figs. 18, 19 and 20 of the drawings. In the depression 48 of the core 19 will be inserted the electric heating element 83 carried on a suitable support, and in the head 39 of the core will also be located a heating element 84 also carried on a suitable support.

Each mold will be enclosed within a divided casing 85, the parts of the casing being secured to the mold sections by suitable bolts or screws 88. Supported between the halves of the mold and the parts of the casing are electric heating elements 86.

The heating elements 83, 84 and 86 will all be suitably insulated and will be connected with lead wires 87 which pass to the centre of the apparatus, where suitable means will be arranged for supplying the heating elements with current as the apparatus is rotated.

From the above description it will be seen that I have devised apparatus which will satisfactorily attain the objects of my invention as set forth in the preamble of this specification, and which will be absolutely automatic in operation.

What I claim as my invention is:—

1. In apparatus for the manufacture of ice cream cones, the combination of a frame; a movable carrier supported on the frame; a plurality of stationary mold sections secured on said carrier; a movable mold section hinged at its lower end to each of the stationary sections; and means supported on a stationary part adapted to clean the mold sections as they pass.

2. In apparatus for the manufacture of ice cream cones, the combination of a frame; a movable carrier supported on the frame; a plurality of stationary mold sections secured on said carrier; a movable mold section hinged at its lower end to each of the stationary sections; and a rotating brush supported on a stationary part adapted to clean the faces of the mold sections as they pass.

3. In apparatus for the manufacture of ice cream cones, the combination of a frame; a movable carrier supported on the frame; a plurality of stationary mold sections secured on said carrier; a movable mold section hinged at its lower end to each of the stationary sections; and a rotating brush supported on a stationary part adapted to clean the faces of the mold sections as they pass, said brush being provided with an enlarged head at each end adapted to clean off the tops of the mold sections.

4. In apparatus for the manufacture of ice cream cones, the combination of a movable carrier; a mold supported on said carrier; an arm pivotally supported on the carrier; a core pivotally supported on said arm adapted to co-operate with the mold; and means for bringing said core into position in the mold at first rapidly and then with diminished speed toward the end of the movement and for locking the arm when the core is in position in the mold, said means including resilient means to permit the non-seating of the core in the mold.

5. In apparatus for the manufacture of ice cream cones, the combination of a movable carrier; a mold supporting member secured on said carrier, the outer end of said member forming a stationary mold section; a movable mold section hinged to the lower end of the stationary mold section; an arm pivoted on said member; a core pivoted on the end of said arm; and means for controlling the swing of the core on its pivot.

6. In apparatus for the manufacture of ice cream cones, the combination of a frame; a movable carrier supported on the frame; a mold supporting member secured to said carrier; an arm pivoted on said member; a core pivoted on the end of said arm; means for controlling the swing of the core on its pivot; and means supported on the frame for actuating said arm and controlling means.

7. In apparatus for the manufacture of ice cream cones, the combination of a frame; a movable carrier supported on the frame; a mold supporting member secured to said carrier; a core-carrying arm pivoted on said member; means supported on the frame for raising the arm; a cam supported at the under side of the carrier; and a locking member pivotally connected with the arm and adapted to engage said cam to hold the arm in its lower position.

8. In apparatus for the manufacture of ice cream cones, the combination of a frame; a movable carrier supported on the frame; a mold supporting member secured to said carrier; a core-carrying arm pivoted on said member; means supported on the frame for raising the arm; a cam supported at the under side of the carrier; a rod slidably supported in said arm, a locking member pivotally connected with the arm and adapted to engage said cam to lock the arm in its lower position; and a spring supported on the rod tending to hold the arm in contact with the member.

9. In apparatus for the manufacture of ice cream cones, the combination of a frame; a movable carrier supported on the frame; a mold supporting member secured to said carrier; a core-carrying arm pivoted on said member; means supported on the frame for raising the arm; a cam supported at the under side of the carrier; a locking member secured to the arm adapted to engage said cam to lock the arm in its lower position; and means for bringing the locking member into locking position at first rapidly and then with diminished speed towards the end of the movement.

10. In apparatus for the manufacture of ice cream cones, the combination of a frame; a movable carrier supported on the frame; a mold supporting member supported on said carrier; an arm pivoted on said member; a core pivoted on the end of said arm; means for regulating the swing of the core on its pivot; means for actuating said regulating means; means supported on the frame for raising the arm; a cam supported at the underside of the carrier; and a locking member secured to the arm adapted to engage said cam to hold the arm in lower position.

11. In apparatus for the manufacture of ice cream cones, the combination of a frame; a rotary carrier supported on the frame; a series of molds arranged circumferentially of the carrier, each mold being formed of a stationary section secured to the carrier and a movable section hinged at its lower end to the stationary section; levers pivoted on the stationary sections having hooked ends adapted to retain the movable sections in closed position; means supported on the frame adapted to unlock the movable sections; means supported on the frame adapted to return the movable sections to closed position; and brushing means adapted to clean the mold sections when they are in open position.

12. In apparatus for the manufacture of ice cream cones, the combination of a frame; a rotary carrier supported on the frame; a series of molds arranged circumferentially of the carrier, each mold being formed of a stationary section secured to the carrier and a movable section hinged at its lower end to the stationary section; levers pivoted on the stationary sections having hooked ends adapted to retain the movable sections in closed position; means supported on the frame adapted to unlock the movable sections; means supported on the frame adapted to return the movable sections to closed position; a series of arms pivotally supported on the carrier; and core members pivoted on said arms adapted to co-operate with said molds.

13. In apparatus for the manufacture of ice cream cones, the combination of a frame; a rotary carrier supported on the frame; a series of molds arranged circumferentially of the carrier, each mold being formed of a stationary section secured to the carrier and a movable section hinged at its lower end to the stationary section; levers pivoted on the stationary sections having hooked ends adapted to retain the movable sections in closed position; means supported on the frame adapted to unlock the movable sections; means supported on the frame adapted to return the movable sections to closed position; a series of arms pivotally supported on the carrier; core members pivoted on said arms adapted to co-operate with the molds; cams supported at the under side of the carrier; cams supported on the frame; and a rod secured to said arms adapted to bring and lock the arms in contact with the carrier, said cams being shaped to return the arms to their lower position at first rapidly and then with diminished speed towards the end of their movement.

14. In apparatus for the manufacture of ice cream cones, the combination of a frame; a rotary carrier supported on the frame; a series of molds arranged circumferentially of the carrier, each mold being formed of a stationary section secured to the carrier and a movable section hinged at its lower end to the stationary section; levers pivoted on the stationary sections having hooked ends adapted to retain the movable sections in closed position; means supported on the frame adapted to unlock the movable sections; means supported on the frame adapted to return the movable sections to closed position; a series of arms pivotally supported on the carrier; core members pivoted on said arms adapted to co-operate with said molds; means for regulating the swing of said core members upon their pivots; cams supported at the under side of the carrier; cams supported on the frame; and rods secured to said arms adapted to bring and lock the arms in contact with the carrier, said cams being shaped to return the arms to their lower position with diminished speed towards the end of their movement.

15. Apparatus for the manufacture of ice cream cones comprising a frame, a movable carrier, a plurality of mold and core units supported on said carrier and a projection on a movable part, in combination with a batter feeding device supported on a stationary part comprising a support, a measuring slide slidable in said support, and a head slidable on the measuring slide, the head being adapted to engage the projection whereby the head, slide and support are telescoped on one another to force batter from the measuring slide into the molds.

16. In batter feeding apparatus, the combination of a supporting member; a batter supply pipe extending through said support and having a closed end and ports formed in its sides; a measuring slide slidable on said pipe within the support; a head slidable on the measuring slide; a rod secured to the head and extending through the slide into the batter supply pipe, said slide and head having ports formed therein normally out of alinement with one another.

17. Batter feeding apparatus as set forth in claim 16 provided with spring means within the support normally holding the slide extended.

18. Batter feeding apparatus as set forth in claim 16 in which the slide and support have a pin and slot connection whereby the slide is slightly rotated while sliding in the support and means are provided to hold the head from rotation on the slide.

19. Batter feeding apparatus as set forth in claim 16 in which the slide and support have a pin and slot connection whereby the slide is slightly rotated while sliding in the support and the head held from rotation on the slide, the slide having a shoulder formed thereon to limit the movement of the head, and the rod having a shoulder formed thereon to limit its movement in the slide.

20. In apparatus for the manufacture of ice cream cones, the combination of a movable carrier; a mold supported on said carrier; an arm pivotally supported on the carrier; a core carried by said arm; a cam supported at the under side of the carrier; and locking means, adjustable in length, carried by the arm adapted to engage the cam to lock the arm in lower position.

21. In apparatus for the manufacture of ice cream cones, the combination of a movable carrier; a mold supported on said carrier; an arm pivotally supported on the carrier; a core carried by said arm; a cam supported at the under side of the carrier; and locking means, adjustable in length, carried by the arm adapted to engage the cam to lock the arm in lower position, said means including a resilient member adapted to permit the non-seating of the core in the mold.

22. In apparatus for the manufacture of ice cream cones, the combination of a movable carrier; a mold supported on said carrier; a core-carrying arm pivotally supported on the carrier; a rod slidable on said arm; a block secured to the lower end of said rod; a locking member pivotally mounted on said block; a cam supported at the under side of the carrier and adapted to be engaged by said locking member; and a nut threaded on the rod above the block adapted to adjust the position of the arm relative to the locking means.

23. In apparatus for manufacture of ice cream cones, the combination of a supporting member; a stationary mold section supported on said member; a movable mold section hinged at its lower end to the lower end of the stationary section; a core-supporting arm pivoted on said supporting member; a core pivoted on said arm; means for actuating the core-supporting arm; and means adapted to rock the core on its pivot away from the stationary section.

24. In apparatus for the manufacture of ice cream cones, the combination of a movable carrier; a mold supported on said carrier; an arm pivotally supported on the carrier; a core pivoted on said arm adapted to co-operate with the mold; cam means for actuating said arm; a rod slidable in said arm; a locking member pivotally connected with said rod; a cam adapted to be engaged by said locking member to lock the arm; and cam means adapted to operate said locking member to lock the arm.

Signed at the city of Owen Sound this 6th day of April, 1921.

ALEXANDER J. WALKER.

Witnesses:
 VERNA C. LAIRD,
 MARION R. JACKSON.